United States Patent
Li et al.

(10) Patent No.: US 9,923,699 B2
(45) Date of Patent: Mar. 20, 2018

(54) METHOD AND APPARATUS FOR FEEDING BACK APERIODIC CSI IN FLEXIBLE TDD RECONFIGURATION SYSTEM

(71) Applicant: Samsung Electronics Co., Ltd., Gyeonggi-do (KR)

(72) Inventors: Yingyang Li, Beijing (CN); Shichang Zhang, Beijing (CN); Chengjun Sun, Beijing (CN)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 26 days.

(21) Appl. No.: 14/295,177

(22) Filed: Jun. 3, 2014

(65) Prior Publication Data
US 2015/0049652 A1 Feb. 19, 2015

(30) Foreign Application Priority Data

Aug. 13, 2013 (CN) .......................... 2013 1 0344515
Oct. 17, 2013 (CN) .......................... 2013 1 0488010

(51) Int. Cl.
H04L 5/00 (2006.01)
H04L 5/14 (2006.01)
H04L 1/00 (2006.01)

(52) U.S. Cl.
CPC .......... H04L 5/0057 (2013.01); H04L 1/0027 (2013.01); H04L 5/1469 (2013.01); H04L 1/0026 (2013.01)

(58) Field of Classification Search
CPC .................................................. H04L 15/0057

(Continued)

(56) References Cited

U.S. PATENT DOCUMENTS

2011/0103247 A1* 5/2011 Chen .................... H04B 7/0452
370/252
2011/0149813 A1 6/2011 Parkvall et al.
(Continued)

OTHER PUBLICATIONS

International Search Report dated Sep. 12, 2014 in connection with International Application No. PCT/KR2014/004924; 4 pages.
(Continued)

*Primary Examiner* — Mang Yeung
*Assistant Examiner* — Peter G Solinsky

(57) ABSTRACT

The present disclosure provides a method for feeding back aperiodic CSI in a flexible TDD reconfiguration cell. The method includes a UE receiving information about signaling transmitted from an eNB to acquire locations of subframes corresponding to CH and CL, wherein CH and CL correspond to different subframe sets, respectively. The method also includes the UE detects UL DCI information carrying an aperiodic CSI request, on a CSI request subframe. The method also includes the UE feeds back aperiodic CSI specific to a corresponding CSI subframe set to the eNB, on a corresponding UL subframe. The embodiments of the present disclosure, according to another aspect, provide a terminal. According to the solutions disclosed in the present disclosure, the terminal acquires indication information of CSI subframe sets during feeding back the aperiodic CSI, by implicitly or explicitly defining the CSI subframe sets, so as to trigger aperiodic CSI feedback specific to CH and CL in a flexible TDD reconfiguration cell, thus improving the system performance.

16 Claims, 4 Drawing Sheets

(58) Field of Classification Search
USPC .......................................................... 370/280
See application file for complete search history.

(56) References Cited

U.S. PATENT DOCUMENTS

| | | | | |
|---|---|---|---|---|
| 2013/0188516 A1* | 7/2013 | He | ........................ | H04W 28/16 370/254 |
| 2013/0235756 A1* | 9/2013 | Seo | ........................ | H04L 1/0026 370/252 |
| 2014/0036796 A1* | 2/2014 | Etemad | ................. | H04W 24/04 370/329 |
| 2014/0334391 A1* | 11/2014 | Khoshnevis | ...... | H04W 72/0413 370/329 |
| 2015/0029910 A1* | 1/2015 | He | ........................ | H04W 76/02 370/280 |
| 2015/0043469 A1* | 2/2015 | Kim | ........................ | H04B 7/26 370/329 |
| 2015/0117380 A1* | 4/2015 | Zhang | ................... | H04W 24/10 370/329 |
| 2015/0124663 A1* | 5/2015 | Chen | ..................... | H04L 5/0053 370/278 |
| 2015/0131568 A1* | 5/2015 | You | ........................ | H04L 5/001 370/329 |
| 2015/0358111 A1* | 12/2015 | Marinier | ............... | H04L 1/0003 370/329 |
| 2016/0050648 A1* | 2/2016 | Seo | ...................... | H04B 7/0626 370/329 |
| 2016/0065276 A1* | 3/2016 | Zhang | ................... | H04L 1/0028 375/267 |
| 2016/0065343 A1* | 3/2016 | Kim | ..................... | H04J 11/0053 370/329 |
| 2016/0105248 A1* | 4/2016 | Lunttila | ............... | H04B 17/345 370/252 |
| 2016/0113020 A1* | 4/2016 | Zhang | ............... | H04W 72/0406 370/329 |
| 2016/0119101 A1* | 4/2016 | Liu | ........................ | H04L 5/0053 370/280 |
| 2016/0197687 A1* | 7/2016 | Song | ........................ | H04L 5/00 370/252 |
| 2016/0227548 A1* | 8/2016 | Nimbalker | ............ | H04L 5/0048 |

OTHER PUBLICATIONS

Written Opinion of International Searching Authority dated Sep. 12, 2014 in connection with International Application No. PCT/KR2014/004924; 6 pages.

LG Electronics; "Air Interface Support for ICIC in Dynamic TDD UL-DL Reconfigurations"; 3GPP TSG RAN WG1 Mtg #73; R1-132226; Fukuoka, Japan; May 2013; 6 pages.

Intel Corp.; "Correction to RI-Reference CSI Process and CSI Process Configuration with Subframe Sets"; 3GPP TSG RAN Mtg #72; R1-130069; St. Julian's, Malta, 2013; 11 pages.

ZTE; "DL Interference Measurement and CSI Feedback Enhancement in Multi-Cell Scenario"; 3GPP TSG RAN WG1 Mtg #73; R1-132106; Fukuoka, Japan; May 2013; 5 pages.

Ericsson, et al.; "On CSI Enhancements for Dynamic TDD"; 3GPP TSG RAN WG1 #73; R1-132027, Fukuoka, Japan; May 2013; 3 pages.

* cited by examiner

METHOD AND APPARATUS FOR FEEDING BACK APERIODIC CSI IN FLEXIBLE TDD RECONFIGURATION SYSTEM

CROSS-REFERENCE TO RELATED APPLICATION(S) AND CLAIM OF PRIORITY

The present application is related to and claims the benefit under 35 U.S.C. § 119(a) of a Chinese patent application filed on Aug. 8, 2013 in the Chinese Intellectual Property Office and assigned Application No. 201310344515.9 and a Chinese patent application filed on Oct. 17, 2013 in the Chinese Intellectual Property Office and assigned Application No. 201310488010.X, the entire disclosures of which are hereby incorporated by reference.

TECHNICAL FIELD

The present disclosure relates to Channel State Information (CSI) feedback technology in communication systems, particularly to aperiodic CSI feedback technology in flexible TDD reconfiguration systems.

BACKGROUND

The Long Term Evolution (LTE) system of 3GPP standardization organization supports both Frequency Division Duplex (FDD) mode and Time Division Duplex (TDD) mode. For the LTE TDD, each radio frame that occupies a length of 10 ms is equally divided into two half-frames each having a length of 5 ms. The LTE TDD frame structure is shown in FIG. 1. Furthermore, each half-frame contains three special domains as well as eight timeslots each having a length of 0.5 ms. These three special domains include a DL pilot timeslot (DwPTS), a guard period (GP) and a UL pilot timeslot (UpPTS), which, in total, have a length of 1 ms. Additionally, each subframe in the LTE TDD frame structure shown in FIG. 1 consists of two consecutive timeslots; that is, the kth subframe contains a timeslot 2k and a timeslot 2k+1.

The LTE TDD supports seven UL-DL configuration modes, as shown in FIG. 1. In FIG. 1, D represents a downlink (DL) subframe, U represents an uplink (UL) subframe, and S represents a special subframe containing the three special domains mentioned above.

According to the regulations as defined by the present LTE protocol, the TDD UL-DL configuration of a cell is semi-static and thus will not be frequently changed by an eNB. At least, the TDD UL-DL configuration in the cell remains unchanged during one time of data transmission.

TABLE 1

| Configuration Mode No. | Switching Period | Subframe No. | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

In an existing LTE/LTE-A system, the UE periodically or aperiodicly feeds back CSI according to the configuration of the eNB so that the eNB can acquire the DL channel condition of the UE. The aperiodic CSI feedback is triggered by a CSI request bit(s) contained in an UL Downlink Control Information (DCI) format. The LTE-A system under 3GPP Standard Protocol Rel. 11 defines ten Transmission Modes (TM). For TM1-9, no CSI Process is involved or the number of involved CSI Processes can be considered as 1. For TM10, the eNB can allocate a plurality of CSI processes to the UE by means of high-layer signaling, and each of these CSI processes can, at the most, be configured with two CSI subframe sets. In one or more CSI processes triggered by one aperiodic CSI feedback, when one CSI process is configured with two CSI subframe sets, one aperiodic CSI feedback triggers CSI feedback specific to one of said two subframe sets CCSI,i (i=0 or 1). In an embodiment, the UE determines a CSI reference resource in one of the DL subframes of CCSI,i, and further measures the CSI; wherein CCSI,i is determined by a DL subframe where a CSI request that triggers above-mentioned aperiodic CSI feedback is located; that is, CCSI,i is a CSI subframe set which contains the subframe where the UL DCI containing the CSI request is located. Thus it can be seen that, according to the 3GPP Standard Protocol Rel. 11, the subframe set, corresponding to the aperiodic CSI that is fed back, is indicated implicitly by a DL subframe where the UL DCI containing the aperiodic CSI request is located.

In order to meet the increasing demands of mobile users, the flexible TDD reconfiguration technology in LTE-A system receives more and more attentions gradually. The flexible TDD reconfiguration technology allows the ratio of current UL subframes to DL subframes adapting to the ratio of current UL traffic load to DL traffic load, in a better way, so as to facilitate the improvement of UL-DL peak rate, and hence increase the throughput capacity of the system.

For a flexible TDD reconfiguration system, the TDD/UL/DL configuration of a cell is dynamically varying depending on the current UL-DL traffic load of the cell, which means that parts of subframes may dynamically change their transmission direction and hence become flexible subframes. In addition, the radio environment of a flexible TDD reconfiguration cell may be influenced by neighbor cells with common frequency or adjacent frequency which usually work at TDD mode, resulting in that parts of DL subframes in the flexible TDD reconfiguration cell are heavily influenced by a neighbor cell which is primarily attributing to the inter-cell interference (hereinafter referred to as primary neighbor cell), e.g., when the subframes on these subframe locations in said primary neighbor are also DL subframes; while the other subframes, usually flexible subframes, are weakly influenced by the primary neighbor cell, e.g., when the subframes on these subframe locations in said primary neighbor cell are UL subframes. In this way, the DL subframes of each radio frame in a flexible TDD reconfiguration cell, including the flexible subframes, may be divided into two subframe sets, $C_H$ and $C_L$, wherein each of the two sets may contain only one element.

For sake of description, the examples that take the DL subframe set heavily influenced by the primary neighbor cell as $C_H$ and take the DL subframe set weakly influenced by the primary neighbor cell as $C_L$ are illustrated. For instance, it is necessary to feedback CSI for the above-mentioned two sets, respectively, so as to take full advantages of the flexible TDD reconfiguration technology.

However, in order to reduce the complexity of DL scheduling sequence, the flexible TDD reconfiguration system may sometimes not transmit UL DCI format through subframes pertaining to $C_L$, because if so, such subframes, usually flexible subframes, may require readjusting the UL scheduling sequence when the flexible subframes mentioned above are switched into UL subframes; moreover, even if it is allowed to transmit the UL DCI through subframes pertaining to $C_L$, the UL subframes corresponding to these subframes, sometimes, may be switched into DL subframes (e.g., when subframe #4 and subframe #9 are pertaining to $C_L$ while subframe #8 and subframe #3 are flexibly switched into DL subframes), then it may be unable to feedback aperiodic CSI specific to $C_L$. This means that the aperiodic CSI feedback specific to $C_L$ may not be triggered if it continues to use the method defined by 3GPP Standard Protocol Rel. 11, i.e., implicitly indicating the subframe set corresponding to the aperiodic CSI that is fed back by a DL subframe where the UL DCI containing the aperiodic CSI request is located.

Thus it can be seen from the analysis above that, for a flexible TDD reconfiguration cell, in order to realize aperiodic CSI feedback specific to $C_H$ and $C_L$, the method defined by 3GPP Standard Protocol Rel. 11 will be confronted with problems that the aperiodic CSI feedback specific to the flexible DL subframes cannot be triggered, which has not been well solved yet, by now.

SUMMARY

To address the above-discussed deficiencies, it is a primary object to provide a method for feeding back aperiodic CSI in flexible TDD reconfiguration, which is capable of effectively feeding back aperiodic CSI specific to CH and CL in a flexible TDD reconfiguration cell.

In order to achieve the objective above, the embodiments of the present disclosure, according to one aspect, provide a method for feeding back aperiodic CSI in a flexible TDD reconfiguration cell, comprising a UE receives information about signaling transmitted from an eNB to acquire locations of subframes corresponding to $C_H$ and $C_L$, wherein $C_H$ and $C_L$ correspond to different subframe sets, respectively; the UE detects UL DCI information carrying an aperiodic CSI request, on a CSI request subframe; and the UE feeds back aperiodic CSI specific to a corresponding CSI subframe set to the eNB, on a corresponding UL subframe.

The embodiments of the present disclosure, according to another aspect, provide a terminal comprising a receiving module, a detecting-determining module and a transmitting module; the receiving module is configured for receiving information about signaling transmitted from an eNB to acquire locations of subframes corresponding to $C_H$ and $C_L$, wherein $C_H$ and $C_L$ correspond to different subframe sets, respectively; the detecting-determining module is configured for detecting UL DCI information carrying an aperiodic CSI request, on a CSI request subframe; and the transmitting module is configured for feeding back aperiodic CSI specific to a corresponding CSI subframe set to the eNB, on a corresponding UL subframe.

According to the above solutions disclosed herein, the terminal acquires indication information of CSI subframe sets during feeding back the aperiodic CSI, by implicitly or explicitly defining identifiers for CSI subframe sets, so as to trigger aperiodic CSI feedback specific to $C_H$ and $C_L$ in a flexible TDD reconfiguration cell, thus improving the system performance. In addition, the above solutions provided by the present disclosure may only make minor modification to the existing apparatuses or systems, and hence will not influence the system compatibility. Moreover, the implementations of these solutions as provided are both simple and highly effective.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
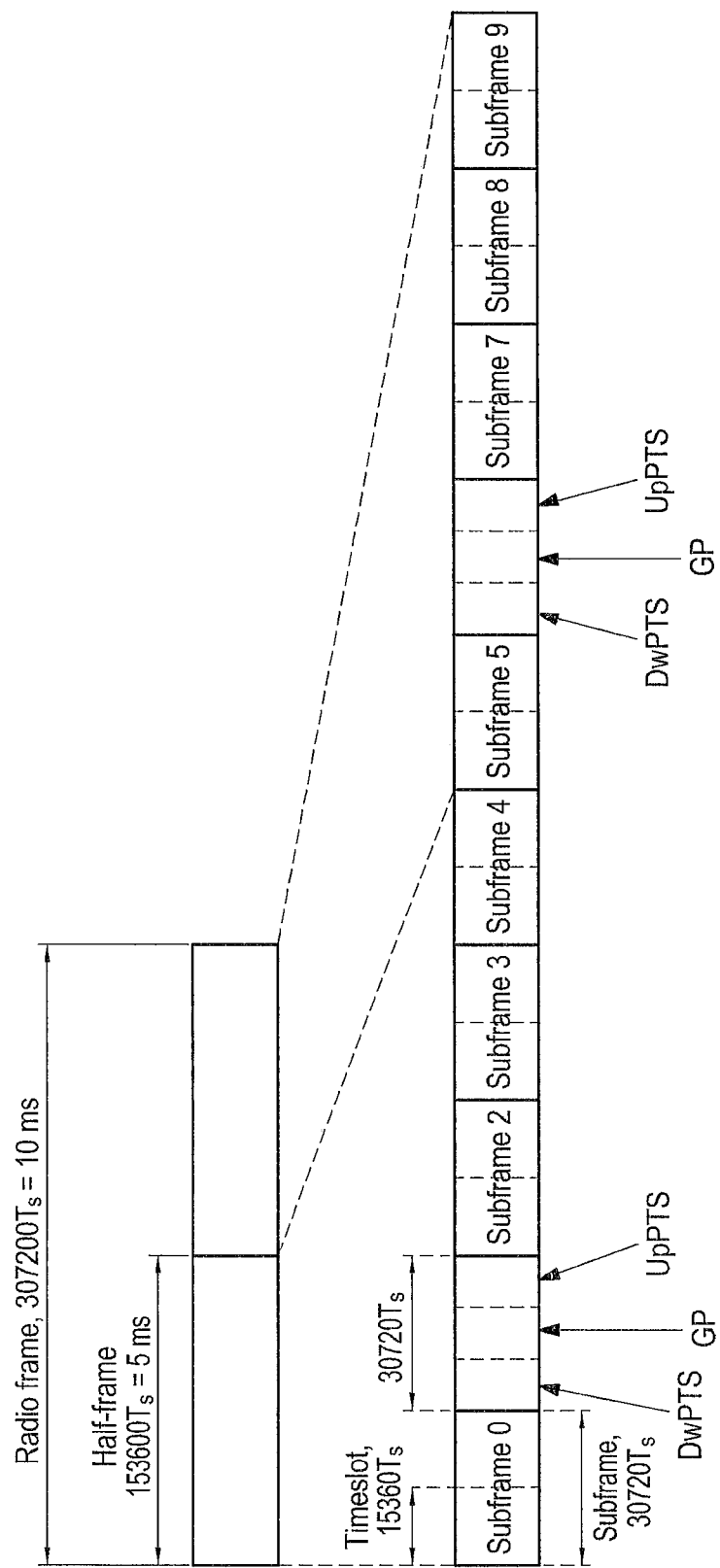
FIG. 1 illustrates a schematic diagram showing the frame structure of LTE TDD.

FIGS. 2 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or method. Hereinafter the embodiments of the present disclosure will be described in details, and the examples of these embodiments have been illustrated in the drawings, in which the identical or similar reference numerals, throughout, refer to the identical or similar elements or elements having identical or similar functions. These examples described by reference to the drawings are illustrative for the purpose of explaining the present disclosure only, which shall not be regarded as constituting any limitations thereto.

It should be appreciated by the person skilled in the art that, unless particularly specified, the "one", "a (an)", "the (said)" and "this (that)" used herein in single forms also refer to plural forms. It should be further understood that, the wordings "include (comprise)" used in the description refer to the existence of the corresponding features, integers, operations, operations, elements and/or components without excluding the possibility of existing or incorporating one or more other features, integers, operations, operations, elements, components and/or groups thereof. It should be realized that when one element is defined to be "connected" or "coupled" to another element, it can be connected or coupled to another element directly or by an intermediate element. In addition, the "connecting" or "coupling" used herein may contain wireless connecting or coupling. The wording "and/or" used herein include any individual of or all the combinations of one or more related items listed herein.

It should be appreciated by the person skilled in the art that, all the terms used herein (including technical terms and scientific terms), unless otherwise specified, refer to the general meanings well known for those skilled in the art to which the present disclosure pertains. It should also be understood that, the terms, such as that defined in the general dictionaries, refer to the meanings consistent with the context of the prior art, and shall not be interpreted excessively ideally or formally, unless as specified herein.

It should be appreciated by the person skilled in the art that, the "UE" and "terminal" used herein may include both the device provided with only radio signal transceiver incapable of transmitting and the device provided with hardware capable of receiving and transmitting for bidirectional communication on two-way communication links. Such device may include: a cellular or other communication device with or without multiplex display; a PCS that may incorporate functions of speech and data process as well as facsimile and/or data communication; a PDA that may comprise RF receiver and receivers of pager, access of Internet/Intranet, web browser, notepad, calendar and/or GPS; and/or conventional, laptop or palmtop computer or other devices provided with RF receiver.

In a mobile communication system such as a flexible TDD reconfiguration cell, it may be required to feedback aperiodic CSI specific to CH and CL, respectively, because the interferences to the above-mentioned two sets resulted by neighbor cells are significantly different; furthermore, it is necessary to redesign the modes for indicating the CSI subframe set to which the aperiodic CSI is specific, according to the characteristics of the flexible TDD reconfiguration system.

For sake of description, hereinafter the DL subframe set CH that is heavily influenced by the primary neighbor cell and the DL subframe set CL that is weakly influenced by the primary neighbor cell are illustrated as examples. It should be appreciated that the division rules for CH and CL are not limited to the above-mentioned examples only, but shall be any appropriate ones according to actual demands. For example, CH may be a flexible subframe set while CL may be a fixed DL subframe set; or, CH may be a heavily influenced DL or flexible subframe set while CL may be a weakly influenced or fixed DL subframe set.

In an embodiment, the essential concept of the present disclosure is to trigger aperiodic CSI feedback specific to CH and CL by defining the correlation between CH, CL and a DL subframe where the DCI containing aperiodic CSI request is located or an UL subframe where the PUSCH carrying aperiodic CSI is located, or by means of explicit bit-indication information in physical-layer signaling.

Figure 2:
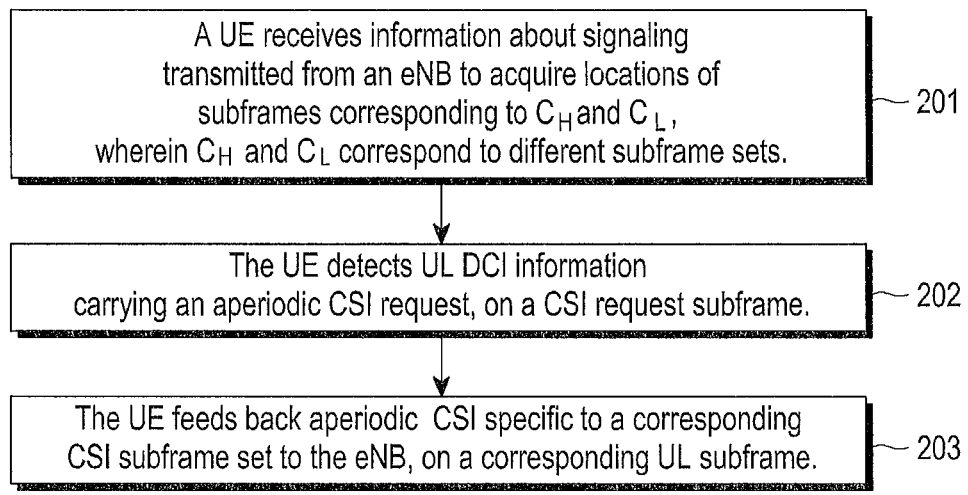
FIG. 2 illustrates a process for feeding back aperiodic CSI in a flexible TDD reconfiguration cell according to an embodiment of the present disclosure.

FIG. 2 illustrates a process for feeding back aperiodic CSI in a flexible TDD reconfiguration cell according to an embodiment of the present disclosure.

In order to achieve the objective of the present disclosure, by way of flow chart, a method for feeding back aperiodic CSI in a flexible TDD reconfiguration cell is shown in FIG. 2, comprising operation 201 to operation 203 as follows:

At operation 201, a UE receives information about signaling transmitted from an eNB to acquire locations of subframes corresponding to $C_H$ and $C_L$, wherein $C_H$ and $C_L$ correspond to different subframe sets, respectively;

At operation 202, the UE detects UL DCI information carrying an aperiodic CSI request, on a CSI request subframe; and At operation 203, the UE feeds back aperiodic CSI specific to a corresponding CSI subframe set to the eNB, on a corresponding UL subframe.

Extended explanations to the technical solutions disclosed in the present disclosure will be given as below, by details.

At operation 201, a UE receives information about signaling transmitted from an eNB to acquire locations of subframes corresponding to $C_H$ and $C_L$, wherein $C_H$ and $C_L$ correspond to different subframe sets, respectively.

At operation 202, the UE detects UL DCI information carrying an aperiodic CSI request, on a CSI request subframe.

Wherein, $C_H$ is a flexible subframe set and $C_L$ is a fixed DL subframe set; or, $C_H$ is a heavily influenced DL or flexible subframe set, and $C_L$ is a weakly influenced or fixed DL subframe set.

In an embodiment, this operation may further include:
if detecting an aperiodic CSI request on a CSI request subframe pertaining to a set $D_H$, the UE feeds back aperiodic CSI specific to $C_H$, on a corresponding UL subframe; if detecting an aperiodic CSI request on a CSI request subframe pertaining to a set $D_L$, the UE feeds back aperiodic CSI specific to $C_L$, on a corresponding UL subframe; or, if the UE feeds back aperiodic CSI on a CSI feedback subframe pertaining to $U_H$ according to the aperiodic CSI request, the aperiodic CSI is specific to $C_H$; if the UE feeds back aperiodic CSI on a CSI feedback subframe pertaining to $U_L$ according to the aperiodic CSI request, the aperiodic CSI is specific to $C_L$.

Wherein, $D_H$ and $D_L$ correspond to different DL subframe sets, respectively, and $U_H$ and $U_L$ correspond to different UL subframe sets, respectively.

Wherein, the UE acquires the subframe set to which the CSI request subframe or the CSI feedback subframe is pertaining, by receiving explicit or implicit signaling transmitted from the eNB; or, the UE acquires the subframe set to which the CSI request subframe or the CSI feedback subframe is pertaining, by means of division standards in accordance with an agreed communication protocol.

That is to say, $D_H$, $D_L$ and $U_H$, $U_L$ are acquired by explicit or implicit signaling or by standard protocols.

Wherein, the explicit signaling includes bit-indication information of high-layer signaling transmitted from the eNB; or, the implicit signaling includes: an index of PDCCH or EPDCCH of UL DCI format detected by the UE, in a PDCCH or EPDCCH search space specified by the UE, wherein the PDCCH or EPDCCH of UL DCI format contains the aperiodic CSI request. The PDCCH or EPDCCH search space as specified by the UE is clearly defined in the LTE protocol.

The embodiment mentioned above will be extended for further explanation later in the first application scenario.

In an embodiment, operation 202 may further include: the UE acquires an aperiodic CSI request bit(s) from the UL DCI, and determines a CSI subframe set requiring for feedback according to the aperiodic CSI request bit(s).

In an embodiment, determining a CSI subframe set requiring for feedback according to the aperiodic CSI request bit(s) comprises: the UE determines the subframe set(s) $C_H$ and/or $C_L$ to which the aperiodic CSI to be fed back is specific, according to the aperiodic CSI request bit(s).

Wherein, it further includes:

if the UE is allocated with a plurality of CSI processes, e.g., if the UE is configured under DL transmission mode TM10 and can support a plurality of CSI processes, it determines one or more CSI processes requiring for feedback according to the aperiodic CSI request bit(s).

Wherein, the UE determines the subframe set(s) $C_H$ and/or $C_L$ to which each of the CSI processes requiring for feedback is specific, according to the aperiodic CSI request bit(s).

The embodiment mentioned above will be extended for further explanation later in the second application scenario.

In an embodiment, before operation 202 the method may further include: the UE acquires the DL subframe set to which the aperiodic CSI to be fed back is specific, by receiving physical-layer signaling transmitted from the eNB.

Wherein, the UE determines the subframe set(s) $C_H$ and/or $C_L$ to which the aperiodic CSI to be fed back is specific, by means of an indication filed in physical-layer signaling for indicating the actual TDD UL-DL configuration currently adopted by the flexible TDD reconfiguration cell.

The embodiment mentioned above will be extended for further explanation later in the third application scenario.

At operation 203, the UE feeds back aperiodic CSI specific to a corresponding CSI subframe set to the eNB, on a corresponding UL subframe.

In an embodiment, operation 203 may further include: depending on a minimum time interval G, the UE determines whether the subframe set, to which a first DL subframe is pertaining, is the $C_H$ or $C_L$, wherein said first DL subframe is a subframe preceding to the CSI feedback subframe and having an interval longer than G with the CSI feedback subframe; and then the UE feeds back aperiodic CSI specific to $C_H$ or $C_L$ to the eNB, on the CSI feedback subframe.

The embodiment mentioned above will be extended for further explanation later in the fourth application scenario.

According to the above solutions disclosed herein, the terminal acquires indication information of a CSI subframe set during feeding back the aperiodic CSI, by implicitly or explicitly defining identifiers for CSI subframe sets so as to trigger aperiodic CSI feedback specific to $C_H$ and $C_L$ in a flexible TDD reconfiguration cell, thus improving the system performance. In addition, the above solutions provided by the present disclosure may only make minor modification to the existing apparatuses or systems, and hence will not influence the system compatibility. Moreover, the implementations of these solutions as provided are both simple and highly effective.

Hereinafter, parts of the embodiments disclosed in the present disclosure will be particularly described in four application scenarios.

Figure 3:
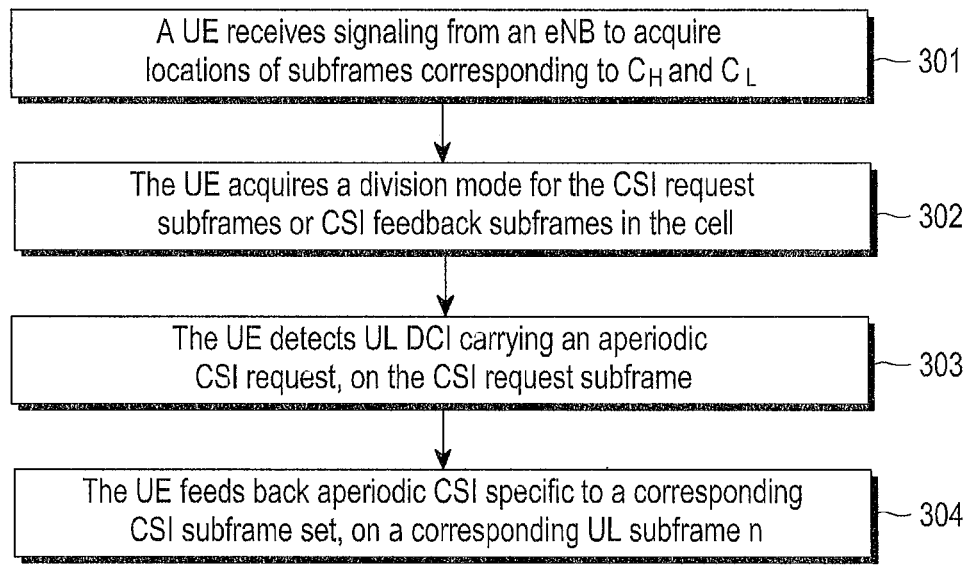
FIG. 3 illustrates a process for implementing a first application scenario according to the present disclosure.

In the present application scenario, correlations between a DL subframe (hereinafter referred to as CSI request subframe, for short) where an UL DCI containing an aperiodic CSI request is located and $C_H$, $C_L$, are defined (hereinafter referred to as the first mode); or, correlations between an UL subframe that feeds back aperiodic CSI (hereinafter referred to as CSI feedback subframe, for short) and $C_H$, $C_L$ are defined (hereinafter referred to as the second mode). The system adopts one of (but not both of) said two methods to realize the indication of a CSI subframe set. In an embodiment, for the first method, the CSI request subframes are divided into two sets, $D_H$ and $D_L$, wherein each of the two sets may contain only one element, and all the aperiodic CSI triggered by the aperiodic CSI requests on DL subframes in $D_H$ is specific to $C_H$, while all the aperiodic CSI triggered by the aperiodic CSI requests on DL subframes in $D_L$ is specific to $C_L$; for the second method, the CSI request subframes are divided into two sets, $U_H$ and $U_L$, and all the aperiodic CSI fed back by the UL subframes in $U_H$ is specific to $C_H$, while all the aperiodic CSI fed back by the UL subframes in $U_L$ is specific to $C_L$. As shown in FIG. 3, the method comprises the following operations:

At operation 301, a UE receives signaling from an eNB to acquire locations of subframes corresponding to $C_H$ and $C_L$; wherein, the signaling usually is a system message or RRC-layer signaling of a cell, and the locations of subframes corresponding to $C_H$ and $C_L$ are indicated by means of Bit Map.

At operation 302, the UE acquires a division mode for the CSI request subframes or CSI feedback subframes in the cell.

Herein the division mode for the CSI request subframes refers to dividing the CSI request subframes into two sets, $D_H$ and $D_L$, wherein the aperiodic CSI feedback triggered by the CSI request on $D_H$ is specific to $C_H$, while the aperiodic CSI feedback triggered by the CSI request on $D_L$ is specific to $C_L$. Herein the division mode for the CSI feedback subframes refers to dividing the CSI feedback subframes into two sets, $U_H$ and $U_L$, each of which may contain only one element, wherein the aperiodic CSI that is fed back on $U_H$ is specific to $C_H$, while the aperiodic CSI that is fed back on $U_L$ is specific to $C_L$.

According to one of the implementations of the present disclosure, the division of the CSI request/feedback subframes can be explicitly indicated by signaling, and then the UE may receive signaling from the cell to acquire division information of the CSI request/feedback subframes. For example, the high-layer signaling can indicate the division of the CSI request/feedback subframes by means of a bit sequence consisting of 20 bits, wherein the first bit in the bit sequence corresponds to the first subframe in a radio frame which satisfies "radio system frame number (SFN) mod 2=0"; and, the other subframes in the radio frame SFN and radio frame SFN+1, in turn, correspond to other bits in the bit sequence; wherein if a bit value equals to 1, it means that the corresponding subframe is pertaining to $D_H$, $D_L$, $U_H$ or $U_L$.

According to another implementation of the present disclosure, the division of the CSI request/feedback subframe is directly defined by standards.

For example, for the first mode, if the TDD UL-DL configuration of the cell broadcast SIB1 belongs to configuration #1 and if the subframe #4 and subframe #9 are configured as MBSFN subframes, the CSI request subframes may include subframe {#0, #1, #4, #5, #6, #9}, and $D_H$ may be defined as subframe {#0, #5, #6} while DL may be defined as subframe {#1, #4, #9}; for the second mode, if subframe #2 and subframe #7 are configured as fixed UL subframes by the cell, i.e., the subframe #2 and subframe #7 may always be UL subframes during the operation of the flexible DD reconfiguration system, $U_H$ may be defined as subframe {#2} while UL may be defined as subframe {#7}.

Another implementation of the second mode according to the present disclosure is to indicate the division of the CSI request subframes by means of implicit signaling, and to indicate the division of the CSI feedback subframes by means of an index of the UL DCI in a PDCCH or EPDCCH search space specified by the UE, wherein the UL DCI carries the aperiodic CSI request. In an embodiment, for example, when the UE specifies that the PDCCH or EPDCCH search space may contain six PDDCCHs or EPDCCHs with corresponding index value Idx (Idx∈{0, 1, . . . 5}), the CSI request subframe is pertaining to $D_L$ if the module N of Idx corresponding to the UL DCI containing the CSI request equals to 0 (wherein N reflects a ratio of subframes in $C_H$ to subframes in $C_L$; let N be 3). Otherwise, the CSI request subframe is pertaining to $D_H$.

At operation 303, the UE detects UL DCI carrying an aperiodic CSI request, on the CSI request subframe.

At operation 304, the UE feeds back aperiodic CSI specific to a corresponding CSI subframe set, on a corresponding UL subframe n.

In an embodiment, if in the first mode, the subframe where the UL DCI containing the aperiodic CSI request is located, as detected by the UE in operation 303 is pertaining to $D_H$, or, if in the second mode the UL subframe n is pertaining to $U_H$, the UE feeds back aperiodic CSI specific to the CSI subframe set $C_H$. The UE shall determine a CSI reference resource in a DL subframe $n-n_{ref}$ and shall further measure the aperiodic CSI, wherein, if the UE is configured under DL transmission mode TM1-9 or other DL TM and allocated with only one CSI process, $n_{ref}$ is a valid DL subframe which allows the CSI reference resource to be located on a subframe containing UL scheduling signaling (UL Grant) which triggers the aperiodic CSI; if the UE is allocated with 2 or 3 CSI processes, e.g., it is configured under DL TM10 and the number of allocated CSI processes is 2 or 3, $n_{ref}$ is a minimum value satisfying $n_{ref}>=4$ and $n-n_{ref}\in C_H$; if the UE is allocated with 4 CSI processes, e.g., it is configured under DL TM10 and the number of allocated CSI processes is 4, $n_{ref}$ is a minimum value satisfying $n_{ref}>=5$ and $n-n_{ref}\in C_H$.

If in the first mode the subframe where the UL DCI containing the aperiodic CSI request is located, as detected by the UE in operation 303 is pertaining to $D_L$, or, if in the second mode the UL subframe n is pertaining to $U_L$, the UE feeds back aperiodic CSI specific to the CSI subframe set $C_L$. The UE shall determine a CSI reference resource in a DL subframe $n-n_{ref}$ and shall further measure the aperiodic CSI, wherein, if the UE is configured under DL transmission mode TM1-9 or other DL TM and allocated with only one CSI process, $n_{ref}$ is a valid DL subframe which allows the CSI reference resource to be located on a subframe containing UL scheduling signaling (UL Grant) which triggers the aperiodic CSI; if the UE is allocated with 2 or 3 CSI processes, e.g., it is configured under DL TM10 and the number of allocated CSI processes is 2 or 3, $n_{ref}$ is a minimum value satisfying $n_{ref}>=4$ and $n-n_{ref}\in C_L$; if the UE is allocated with 4 CSI processes, e.g., it is configured under DL TM10 and the number of allocated CSI processes is 4, $n_{ref}$ is a minimum value satisfying $n_{ref}>=5$ and $n-n_{ref}\in C_L$.

So far, the present application scenario ends. According to the method of the present application scenario, an aperiodic CSI feedback specific to CH or CL can be triggered by indications of CSI request subframes or CSI feedback subframes. It should be appreciated that the implementations of operation 302 is not limited to the illustrated example, but can be realized by other appropriate means, as long as it is performed before S304; that is, the information about the subframes that are used for feedback shall be acquired in advance, but it is not necessary to be performed between operation 301 and operation 303.

Figure 4:
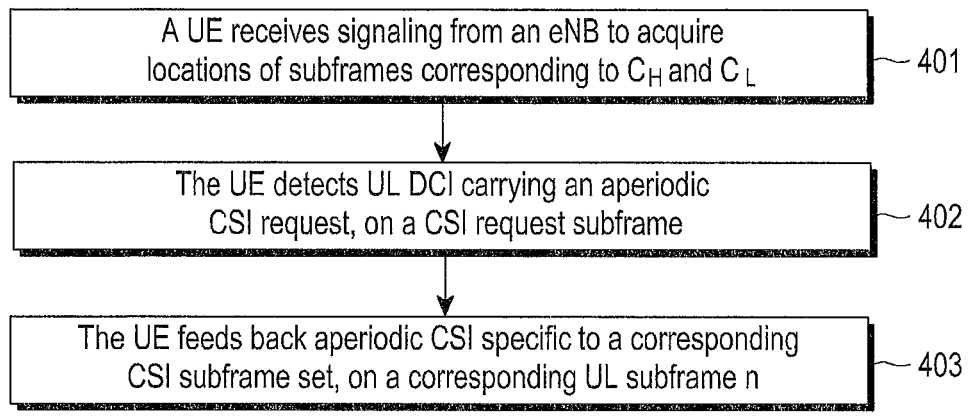
FIG. 4 illustrates a process for implementing a second application scenario according to the present disclosure.

In the present application scenario, the UE feeds back aperiodic CSI specific to a corresponding CSI subframe set. As shown in FIG. 4, it comprises the operations as follows:

At operation 401, a UE receives signaling from an eNB to acquire locations of subframes corresponding to $C_H$ and $C_L$.

Wherein, the signaling usually is a system message or RRC-layer signaling of a cell, and the locations of subframes corresponding to $C_H$ and $C_L$ are indicated by means of Bit Map.

At operation 402, the UE detects UL DCI carrying an aperiodic CSI request, on a CSI request subframe.

At operation 403, the UE feeds back aperiodic CSI specific to a corresponding CSI subframe set, on a corresponding UL subframe n.

The CSI subframe set, to which the aperiodic CSI to be fed back is specific, is related to a state of aperiodic CSI request bit(s) detected in operation 402. Herein, the serving cell where the PUSCH scheduled by UL scheduling signaling (UL Grant) containing the CSI request bit(s) is located, is denoted by a serving cell c.

According to one of the implementations of the present disclosure, assuming that the UE is configured with only one serving cell under DL transmission mode TM1-9 or other TM, and allocated with only one CSI process; e.g., it is configured under TM 10 with only one CSI process, and the CSI subframes are divided into 2 CSI subframe sets. Assuming it is a 2-bit CSI request, then each codeword of the 2 bits can be redefined so as to indicate triggering aperiodic CSI, and to further indicate the aperiodic CSI to be triggered is specific to which one of the CSI subframe sets or to further indicate triggering the CSI of both of the two CSI subframe sets simultaneously. One of the possible indicating modes is shown in Table 1, as an example. Assuming it is a 1-bit CSI request, then a bit value "0" may be defined to indicate not feeding back aperiodic CSI, while a bit value "1" may be defined to indicate feeding back aperiodic CSI of two CSI subframe sets simultaneously; or, the bit values may be defined such that: the aperiodic CSI that is fed back under the indication of bit value "1" and the aperiodic CSI that is fed back under the indication of a codeword (any one of "01", "10" and "11") with a 2-bit CSI request, for example, are specific to the same subframe set indicated by the codeword "01".

TABLE 2

CSI request bit(s) State and Corresponding Indication thereof (For a 2-bit CSI Request)

| CSI request bit(s) Value | Corresponding Indication |
|---|---|
| '00' | Not feeding back aperiodic CSI |
| '01' | Feeding back aperiodic CSI specific to $C_H$ |
| '10' | Feeding back aperiodic CSI specific to $C_L$ |
| '11' | Feeding back aperiodic CSI specific to both CH and $C_L$ |

According to another implementation of the present disclosure, assuming that the UE is working in both the carrier aggregation mode and the flexible TDD reconfiguration mode, and for each carrier, configured under DL TM1-9 or other DL TM with one CSI process; e.g., it is configured under DL TM10 with one CSI process. Herein, each carrier can divide the subframes into two CSI subframe sets, at the most. For example, a Pcell may support a configuration of two CSI subframe sets at the most, but a Scell may not support to distinguish the CSI subframe sets. Assuming it is a 2-bit CSI request, then each codeword of the 2 bits can be redefined, so as to indicate the triggered aperiodic CSI is specific to which set of serving cell(s), and to further indicate the triggered aperiodic CSI is specific to which one of the two CSI subframe sets divided by the serving cell or to further indicate triggering aperiodic CSI of both of the two CSI subframe sets of the above-mentioned serving cell simultaneously. Herein, a set of serving cell(s) may contain one or more serving cells which are allocated to the UE. If a certain carrier is not configured with two CSI subframe sets, there may be no need to distinguish the CSI subframe sets; instead, it may trigger one piece of aperiodic CSI of said carrier. Herein, for the codeword "01", it is also possible to trigger the aperiodic CSI of the serving cell c only. For example, Table 2-2A and Table 2-2B show two possible indicating modes, respectively. Assuming it is a 1-bit CSI request, then a bit value "0" may be defined to indicate not feeding back aperiodic CSI, while a bit value "1" may indicate feeding back aperiodic CSI of all the CSI subframes in all the serving cells, simultaneously; or, the bit values may be defined such that: a bit value "1" and a codeword (any one of "01", "10" and "11") for a 2-bit CSI request, e.g., both indicate a feedback of the same aperiodic CSI indicated by the codeword "01".

TABLE 2A

CSI request bit(s) Value and Corresponding Indication thereof

| CSI request bit(s) Value | Corresponding Indication |
|---|---|
| '00' | Not feeding back aperiodic CSI |
| '01' | Feeding back aperiodic CSI of serving cell c, including aperiodic CSI of $C_H$ and $C_L$ when it is configured with two CSI subframe sets |
| '10' | Feeding back aperiodic CSI of a first set of serving cell(s); and, for the serving cell configured with two CSI subframe sets, indicating feeding back aperiodic CSI of $C_H$ |
| '11' | Feeding back aperiodic CSI of a second set of serving cell(s); and, for the serving cell configured with two CSI subframe sets, indicating feeding back aperiodic CSI of $C_L$ |

TABLE 2B

CSI request bit(s) Value and Corresponding Indication thereof

| CSI request bit(s) Value | Corresponding Indication |
|---|---|
| '00' | Not feeding back aperiodic CSI |
| '01' | Feeding back aperiodic CSI of serving cell c, including aperiodic CSI of $C_H$ and $C_L$ when it is configured with two CSI subframe sets |
| '10' | Feeding back aperiodic CSI of a first set of serving cell(s); and further, for the serving cell configured with two CSI subframe sets: Indicating that the aperiodic CSI to be fed back is specific to which one of $C_H$ and $C_L$, or, indicating feeding back aperiodic CSI of both $C_H$ and $C_L$, simultaneously |
| '11' | Feeding back aperiodic CSI of a second set of serving cell(s); and further, for the serving cell configured with two CSI subframe sets: indicating that the aperiodic CSI to be fed back is specific to which one of $C_H$ and $C_L$, or, indicating feeding back aperiodic CSI of both $C_H$ and $C_L$, simultaneously |

According to yet another implementation of the present disclosure, assuming that the UE is working in both the carrier aggregation mode and the flexible TDD reconfiguration mode, and each carrier works under DL TM1-9 or other DL TM with one allocated CSI process; e.g., it is configured under DL TM10 with one CSI process. Herein, each carrier can divide the subframes into two CSI subframe sets, at the most. In an embodiment, a Pcell may support a configuration of two CSI subframe sets at the most, but a Scell may not support to distinguish CSI subframe sets. The CSI request mentioned above may be extended to, for example, a 3-bit CSI request, and hence the CSI subframe set, to which the aperiodic CSI is specific, will be indicated by the state of the 3 bits. For each codeword of the 3 bits, it is indicated to trigger aperiodic CSI of a set of serving cell(s), and to further indicate the aperiodic CSI to be triggered is specific to which one of CSI subframe sets divided by the serving cell or to further indicate triggering aperiodic CSI of both of the two CSI subframe sets of the above-mentioned serving cell simultaneously. Herein, a set of serving cell(s) may contain one or more serving cells which are allocated to the UE. If a certain carrier is not configured with two CSI subframe sets, there may be no need to distinguish the CSI subframe sets; instead, it may trigger one piece of aperiodic CSI of said carrier. Table 3 shows one of possible indicating modes. Assuming it is a 1-bit CSI request, then a bit value "0" may be defined to indicate not feeding back aperiodic CSI, while a bit value "1" may indicate feeding back aperiodic CSI of all the CSI subframes in all the serving cells, simultaneously; or, the bit values may be defined such that: the aperiodic CSI that is fed back under the indication of bit value "1" and the aperiodic CSI that is fed back under the indication of a codeword (any one except "000") with a 3-bit CSI request, for example, are specific to the same serving cell and subframe set indicated by the codeword "001".

TABLE 3

CSI request bit(s) Value and Corresponding Indication thereof under Flexible TDD Reconfiguration and Carrier Aggregation

| CSI request bit(s) Value | Corresponding Indication |
|---|---|
| '000' | Not feeding back aperiodic CSI |
| '001' | Feeding back aperiodic CSI of serving cell c, the aperiodic CSI being specific to $C_H$ when it is configured with two CSI subframe sets |
| '010' | Feeding back aperiodic CSI of a first set of serving cell(s), the aperiodic CSI being specific to $C_H$ when the serving cell is configured with two CSI subframe sets |
| '011' | Feeding back aperiodic CSI of a second set of serving cell(s), the aperiodic CSI being specific to $C_H$ when the serving cell is configured with two CSI subframe sets |
| '100' | Feeding back aperiodic CSI of serving cell c, the aperiodic CSI being specific to both $C_H$ and $C_L$ when the serving cell is configured with two CSI subframe sets |
| '101' | Feeding back aperiodic CSI of serving cell c, the aperiodic CSI being specific to $C_L$ when the serving cell is configured with two CSI subframe sets |
| '110' | Feeding back aperiodic CSI of a first set of serving cell(s), the aperiodic CSI being specific to $C_L$ when the serving cell is configured with two CSI subframe sets |
| '111' | Feeding back aperiodic CSI of a second set of serving cell(s), the aperiodic CSI being specific to $C_L$ when the serving cell is configured with two CSI subframe sets |

According to yet another implementation of the present disclosure, assuming that the UE is configured with a serving cell working in the flexible TDD reconfiguration mode and allocated with a plurality of CSI processes; e.g., it is configured under DL TM10 and supports a plurality of CSI processes. Herein, each CSI process can further divide the subframes into two CSI subframe sets, at the most. Assuming it is a 2-bit CSI request, then each codeword of the two bits can be redefined, so as to indicate triggering aperiodic CSI of a set of process(es), and to further indicate the aperiodic CSI to be triggered is specific to which one of the CSI subframe sets or to further indicate triggering the CSI of both of the two CSI subframe sets simultaneously. Two possible indicating modes are shown in Table 4-1 and Table 4-2, respectively, as an example. In Table 4-1 and Table 4-2, if a CSI process is not configured with two CSI subframe sets, there may be no need to distinguish the CSI subframe sets; instead, it may trigger one piece of aperiodic CSI of this CSI process. Assuming it is a 1-bit CSI request, then a bit value "0" may be defined to indicate not feeding back aperiodic CSI, while a bit value "1" may indicate feeding back aperiodic CSI of all the CSI subframes in all the CSI processes simultaneously; or, the bit value "1" may indicate feeding back aperiodic CSI of all the CSI subframes in a set of CSI process(es) simultaneously; or, the bit values may be defined such that: the aperiodic CSI that is fed back under the indication of bit value "1" and the aperiodic CSI that is fed back under the indication of a codeword (any one of "01", "10" and "11") for a 2-bit CSI request, e.g., are specific to the same set of CSI process(es) and subframe set indicated by the codeword "01".

TABLE 4A

CSI request bit(s) State and Corresponding Indication thereof (For a 2-bit CSI Request)

| CSI request bit(s) Value | Corresponding Indication |
|---|---|
| '00' | Not feeding back aperiodic CSI |
| '01' | Feeding back aperiodic CSI specific to a set of CSI process(es), the aperiodic CSI being related to $C_H$ when the CSI process is configured with two CSI subframe sets |
| '10' | Feeding back aperiodic CSI specific to a set of CSI process(es), the aperiodic CSI being related to $C_L$ when the CSI process is configured with two CSI subframe sets |
| '11' | Feeding back aperiodic CSI specific to a set of CSI process(es) the aperiodic CSI being related to both $C_H$ and $C_L$ when the CSI process is configured with two CSI subframe sets |

TABLE 4B

CSI request bit(s) Value and Corresponding Indication thereof (For a 2-bit CSI Request)

| CSI request bit(s) Value | Corresponding Indication |
|---|---|
| '00' | Not feeding back aperiodic CSI |
| '01' | Feeding back aperiodic CSI specific to a set of CSI process(es), the aperiodic CSI being related to $C_H$ when the CSI process is configured with two CSI subframe sets |
| '10' | Feeding back aperiodic CSI specific to a set of CSI process(es), the aperiodic CSI being related to $C_L$ when the CSI process is configured with two CSI subframe sets |
| '11' | Feeding back aperiodic CSI specific to a set of CSI process(es), and further, when the CSI process is configured with two CSI subframe sets: indicating the aperiodic CSI is related to which one of $C_H$ and $C_L$; or, Indicating feeding back aperiodic CSI of both of $C_H$ and $C_L$, simultaneously |

According to yet another implementation of the present disclosure, assuming that the UE is configured with only one serving cell working in the flexible TDD reconfiguration mode and is allocated with a plurality of CSI processes; e.g., it is configured under DL TM10 and supports a plurality of CSI processes. Herein, each CSI process can further divide the subframes into two CSI subframe sets, at the most. Assuming the CSI request mentioned above is extended to, for example, a 3-bit CSI request, and hence the CSI subframe set, to which the aperiodic CSI is specific, will be indicated by the state of the 3 bits. Therefore it is capable of indicating triggering aperiodic CSI of a set of process(es), and further indicating the aperiodic CSI to be triggered is specific to which one of the CSI subframe sets or further indicating triggering the CSI of both of the two CSI subframe sets simultaneously. Table 5 shows one of possible indicating modes, as an example. In Table 5, if a CSI process is not configured with two CSI subframe sets, there may be no need to distinguish the CSI subframe sets; instead, it may trigger one piece of aperiodic CSI of this CSI process. Assuming it is a 1-bit CSI request, then a bit value "0" may be defined to indicate not feeding back aperiodic CSI, while a bit value "1" may indicate feeding back aperiodic CSI of all the CSI subframes in all the CSI processes simultaneously; or, the bit value "1" may indicate feeding back aperiodic CSI of all the CSI subframes in a set of CSI process(es) simultaneously; or, the bit values may be defined such that: the aperiodic CSI that is fed back under the indication of bit value "1" and the aperiodic CSI that is fed back under the indication of a codeword (any one except "000") for a 3-bit CSI request, e.g., are specific to the same set of CSI process and subframe set indicated by the codeword "001".

TABLE 5

CSI request bit(s) Value and Corresponding Indication thereof under Flexible TDD Reconfiguration and Multi-CSI Process Set

| Bit Value of CSI Request | Corresponding Indication |
|---|---|
| '000' | Not feeding back aperiodic CSI |
| '001' | Feeding back aperiodic CSI of a first set of CSI process(es), the aperiodic CSI being specific to $C_H$ when the CSI process is configured with two CSI subframe sets |
| '010' | Feeding back aperiodic CSI of a second set of CSI process(es), the aperiodic CSI being specific to $C_H$ when the CSI process is configured with two CSI subframe sets |
| '011' | Feeding back aperiodic CSI of a second set of CSI process(es), the aperiodic CSI being specific to both $C_H$ and $C_L$ when the CSI process is configured with two CSI subframe sets |
| '100' | Reserving |
| '101' | Feeding back aperiodic CSI of a first set of CSI process(es) with high-layer configuration, the aperiodic CSI being specific to $C_L$ when the CSI process is configured with two CSI subframe sets |
| '110' | Feeding back aperiodic CSI of a second set of CSI process(es) with high-layer configuration, the aperiodic CSI being specific to $C_L$ when the CSI process is configured with two CSI subframe sets |
| '111' | Feeding back aperiodic CSI of a fourth set of CSI process(es), and further, when the CSI process is configured with two CSI subframe sets: indicating that the aperiodic CSI is specific to which one of $C_H$ and $C_L$; or, Indicating feeding back aperiodic CSI of both of $C_H$ and $C_L$, simultaneously |

According to yet another implementation of the present disclosure, assuming that the UE can be configured with a plurality of serving cells; wherein, at least one of these serving cells is working in the flexible TDD reconfiguration mode, and each of these serving cells can be allocated with a plurality of CSI processes; e.g., it may be configured under DL TM10 and support a plurality of CSI processes. Herein, each CSI process can further be allocated with two CSI subframe sets, at the most. In an embodiment, it may support a CSI process on a Pcell to be configured with two CSI subframe sets, but it may not support a CSI process on a Scell to distinguish CSI subframe sets. Assuming it is a 2-bit CSI request, then each codeword of the two bits can be re-defined, so as to indicate triggering aperiodic CSI of a set of serving cell(s), with each of the triggered servicing cells being configured with aperiodic CSI of a set of CSI process(es), and further to indicate each of the aperiodic CSI to be triggered is specific to which one of the CSI subframe sets or further to indicate triggering the CSI of both of the two CSI subframe sets simultaneously. Two possible indicating modes are shown in Table 6-1 and Table 6-2, respectively, as an example. In Table 6-1 and Table 6-2, if a CSI process is not configured with two CSI subframe sets, it may trigger one piece of aperiodic CSI of this CSI process without distinguishing the CSI subframe sets. Assuming it is a 1-bit CSI request, then a bit value "0" may be defined to indicate not feeding back aperiodic CSI, while a bit value "1" may indicate feeding back aperiodic CSI of all the CSI subframes of all the CSI processes in the serving cell c simultaneously; or, the bit value "1" may indicate feeding back aperiodic CSI of all the CSI subframes of a set of CSI process(es) in the serving cell c simultaneously; or, the bit values may be defined such that: the aperiodic CSI that is fed back under the indication of bit value "1" and the aperiodic CSI that is fed back under the indication of a codeword (any one of "01", "10" and "11") for a 2-bit CSI request, e.g., are specific to the same set of CSI process(es) and subframe set indicated by the codeword "01".

TABLE 6A

CSI request bit(s) Value and Corresponding Indication thereof (For a 2-bit CSI Request)

| CSI request bit(s) Value | Corresponding Indication |
| --- | --- |
| '00' | Not feeding back aperiodic CSI |
| '01' | Feeding back aperiodic CSI specific to a set of CSI process(es)a set of CSI process(es) of serving cell c, the aperiodic CSI being related to $C_H$ when the CSI process is configured with two CSI subframe sets |
| '10' | Feeding back aperiodic CSI specific to a CSI process se of serving cell c, the aperiodic CSI being related to $C_L$ when the CSI process is configured with two CSI subframe sets |
| '11' | Feeding back aperiodic CSI specific to a set of CSI process(es), the aperiodic CSI being related to both $C_H$ and $C_L$ when the CSI process is configured with two CSI subframe sets |

TABLE 6B

CSI request bit(s) Value and Corresponding Indication thereof (For a 2-bit CSI Request)

| CSI request bit(s) Value | Corresponding Indication |
| --- | --- |
| '00' | Not feeding back aperiodic CSI |
| '01' | Feeding back aperiodic CSI specific to a set of CSI process(es)a set of CSI process(es) of serving cell c, the aperiodic CSI being related to $C_H$ when the CSI process is configured with two CSI subframe sets |
| '10' | Feeding back aperiodic CSI specific to a set of CSI process(es)a set of CSI process(es) of serving cell c, the aperiodic CSI being related to $C_L$ when the CSI process is allocated with two CSI subframe sets |
| '11' | Feeding back aperiodic CSI specific to a set of CSI process(es), and further, when the CSI process is configured with two CSI subframe sets: |

TABLE 6B-continued

CSI request bit(s) Value and Corresponding Indication thereof (For a 2-bit CSI Request)

| CSI request bit(s) Value | Corresponding Indication |
| --- | --- |
| | indicating that the aperiodic CSI is related to which one of $C_H$ and $C_L$, or, Indicating feeding back aperiodic CSI of both of $C_H$ and $C_L$, simultaneously |

According to still another implementation of the present disclosure, assuming that the UE can be configured with a plurality of serving cells; wherein, at least one of these serving cells is working in the flexible TDD reconfiguration mode, and each of these serving cells can be allocated with a plurality of CSI processes; e.g., it may be configured under DL TM10 and support a plurality of CSI processes. Herein, each CSI process can further divide the subframes into two CSI subframe sets, at the most. For example, a Pcell may support a configuration of two CSI subframe sets at the most, but a Scell may not support to distinguish CSI subframe sets. Assuming that the CSI request mentioned above is extended to, e.g., a 3-bit CSI request, and hence the CSI subframe set, to which the aperiodic CSI is specific, will be indicated by the state of the 3 bits. Therefore, it capable of indicating triggering aperiodic CSI of a set of serving cell(s), with each of the triggered servicing cells being configured with aperiodic CSI of a set of CSI process(es), and further indicating each of the aperiodic CSI to be triggered is specific to which one of the CSI subframe sets or further indicating triggering the CSI of both of the two CSI subframe sets simultaneously. One of possible indicating modes, as an example, is shown in Table. 7. In Table. 7, if a CSI process is not configured with two CSI subframe sets, there may be no need to distinguish the CSI subframe sets; instead, it may trigger one piece of aperiodic CSI of this CSI process. Assuming it is a 1-bit CSI request, then a bit value "0" may be defined to indicate not feeding back aperiodic CSI, while a bit value "1" may indicate feeding back aperiodic CSI of all the CSI subframes of all the CSI processes in the serving cell c simultaneously; or, the bit value "1" may indicate feeding back aperiodic CSI of all the CSI subframes of a set of CSI process(es) in the serving cell c simultaneously; or, the bit values may be defined such that: the aperiodic CSI that is fed back under the indication of bit value "1" and the aperiodic CSI that is fed back under the indication of a codeword (except "000") for a 3-bit CSI request, e.g., the codeword "001", are specific to the same set of CSI process(es) and subframe set indicated by the codeword "001".

TABLE 7

CSI request bit(s) Value and Corresponding Indication thereof under Flexible TDD Reconfiguration and Multi-CSI Process Set

| CSI request bit(s) Value | Corresponding Indication |
| --- | --- |
| '000' | Mot feeding back aperiodic CSI |
| '001' | Feeding back aperiodic CSI of a first set of CSI process(es) in serving cell c, the aperiodic CSI being specific to $C_H$ when the CSI process is configured with two CSI subframe sets |

TABLE 7-continued

CSI request bit(s) Value and Corresponding Indication thereof under Flexible TDD Reconfiguration and Multi-CSI Process Set

| CSI request bit(s) Value | Corresponding Indication |
|---|---|
| '010' | Feeding back aperiodic CSI of a second set of CSI process(es) in serving cell c, the aperiodic CSI being specific to $C_H$ when the CSI process is configured with two CSI subframe sets |
| '011' | Feeding back aperiodic CSI of a second set of CSI process(es), the aperiodic CSI being specific to both $C_H$ and $C_L$ when the CSI process is configured with two CSI subframe sets |
| '100' | Reserving |
| '101' | Feeding back aperiodic CSI of a first set of CSI process(es) in serving cell c, the aperiodic CSI being specific to $C_L$ when the CSI process is configured with two CSI subframe sets |
| '110' | Feeding back aperiodic CSI of a second set of CSI process(es) in serving cell c, the aperiodic CSI being specific to $C_L$ when the CSI process is configured with two CSI subframe sets |
| '111' | Feeding back aperiodic CSI of a fourth set of CSI process(es), and further, for each CSI process that is configured with two CSI subframe sets: Indicating that the aperiodic CSI is specific to which one of $C_H$ and $C_L$; or, indicating feeding back aperiodic CSI of both of $C_H$ and $C_L$, simultaneously |

In an embodiment, according to the indication of aperiodic CSI request bit(s) in operation 402, if the UE shall feed back aperiodic CSI specific to CSI subframe set $C_H$, then the CSI reference resource of the UE is determined in DL subframe $n-n_{ref}$, and the UE further measures the aperiodic CSI. Wherein, if the UE is configured under DL TM1-9 or other DL TM and allocated with only one CSI process, $n_{ref}$ is a valid DL subframe that allows the CSI reference resource to be located on a subframe containing the UL Grant which triggers the aperiodic CSI; if the UE is allocated with 2 or 3 CSI processes, e.g., it is configured under DL TM10 and the number of allocated CSI processes is 2 or 3, $n_{ref}$ is a minimum value satisfying $n_{ref}>=4$ and $n-n_{ref} \epsilon C_H$; if the UE is allocated with 4 CSI processes, e.g., it is configured under DL TM10 and the number of allocated CSI processes is 4, $n_{ref}$ is a minimum value satisfying $n_{ref}>=5$ and $n-n_{ref} \epsilon C_H$.

According to the indication of aperiodic CSI request bit(s) in operation 402, if the UE shall feed back aperiodic CSI specific to CSI subframe set $C_L$, then the aperiodic CSI that is fed back by the UE is detected on a CSI reference resource in a DL subframe $n-n_{ref}$. Wherein, if the UE is configured under DL TM1-9 or other DL TM and allocated with only one CSI process, $n_{ref}$ is a valid DL subframe that allows the CSI reference resource to be located on a subframe containing the UL Grant which triggers the aperiodic CSI; if the UE is allocated with 2 or 3 CSI processes, e.g., it is configured under DL TM10 and the number of allocated CSI processes is 2 or 3, $n_{ref}$ is a minimum value satisfying $n_{ref}>=4$ and $n-n_{ref} \epsilon C_L$; if the UE is allocated with 4 CSI processes, e.g., it is configured under DL TM10 and the number of allocated CSI processes is 4, $n_{ref}$ is a minimum value satisfying $n_{ref}>=5$ and $n-n_{ref} \epsilon C_L$.

So far, the present application scenario is ended. As above, the aperiodic CSI feedback specific to different CSI subframe sets can be triggered by redefining the Indication of the aperiodic CSI request bit(s) or by adding additional bit-indication modes.

The Third Application Scenario

Figure 5:
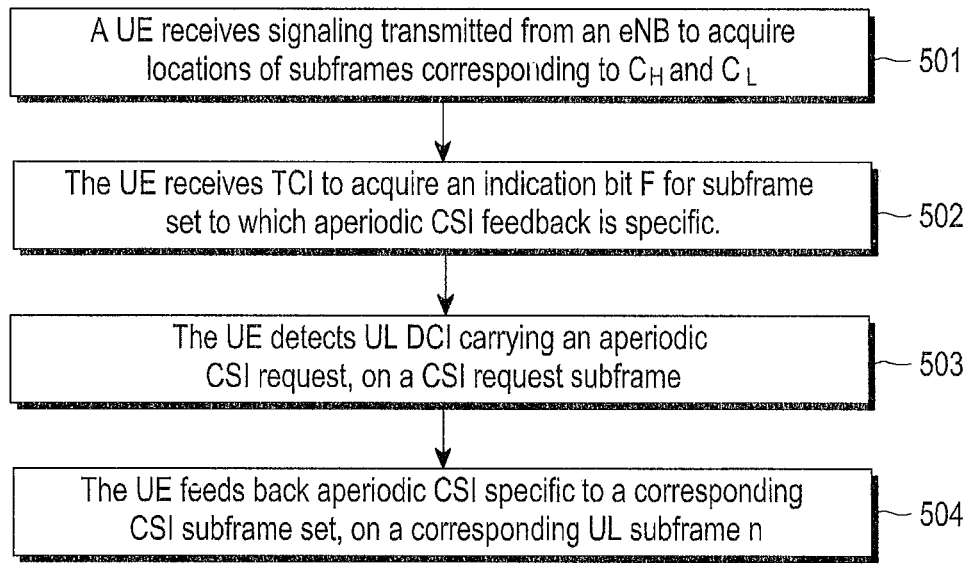
FIG. 5 illustrates a process for implementing a third application scenario according to the present disclosure.

In a flexible TDD reconfiguration cell, the system usually informs UE working in the flexible TDD reconfiguration mode in the cell of the actual TDD UL-DL configuration currently adopted, by means of physical-layer signaling. In the present application scenario, the subframe set, to which the aperiodic CSI feedback is specific, is indicated by adding an indication filed F for CSI subframe set to the TCI. As shown in FIG. 5, the method comprises operations as follows:

At operation 501, a UE receives signaling transmitted from an eNB to acquire locations of subframes corresponding to $C_H$ and $C_L$.

Wherein, the signaling usually is a system message or RRC-layer signaling of a cell, and the locations of subframes corresponding to $C_H$ and $C_L$ are indicated by means of Bit Map.

At operation 502, the UE receives TCI to acquire an indication bit F for subframe set to which aperiodic CSI feedback is specific.

At operation 503, the UE detects UL DCI carrying an aperiodic CSI request, on a CSI request subframe.

At operation 504, the UE feeds back aperiodic CSI specific to a CSI subframe set indicated by the filed F, on a corresponding UL subframe n.

Assuming that the TCI transmission period includes T radio frames, then the CSI subframe set, to which the aperiodic CSI that is fed back is specific, is related to a filed F detected by the UE during a certain TCI transmission period. According to one of the implementations of the present disclosure, the above-mentioned TCI transmission period involves UL DCI containing an aperiodic CSI request; according to another implementation of the present disclosure, the above-mentioned TCI transmission period involves an UL subframe which feeds back the aperiodic CSI request. Wherein, for the above-mentioned two implementations, one of the possible correlations between the value for filed F and the aperiodic CSI subframe set is shown in Table 8 or Table 9.

TABLE 8

Correlation between Value for 1-bit Filed F and Aperiodic CSI Subframe Set

| Value for Filed F | Corresponding Indication |
|---|---|
| '0' | Feeding back aperiodic CSI specific to $C_H$ |
| '1' | Feeding back aperiodic CSI specific to $C_L$ |

TABLE 9

Correlation between Value for 2-bit Filed F and Aperiodic CSI Subframe Set

| Value of Filed F | Corresponding Indication |
|---|---|
| '00' | Feeding back aperiodic CSI specific to $C_H$ |
| '01' | Feeding back aperiodic CSI specific to $C_L$ |
| '10' | Feeding back aperiodic CSI specific to both $C_H$ and $C_L$, simultaneously |
| '11' | Reserving |

In an embodiment, according to the indication of the indication filed F for aperiodic CSI set in operation 402, the UE shall feed back aperiodic CSI specific to CSI subframe set Cu, then the CSI reference resource of the UE is determined in DL subframe $n-n_{ref}$ and the UE further measures the aperiodic CSI. Wherein, if the UE is configured under DL TM1-9 or other DL TM and allocated with only one CSI process, $n_{ref}$ is a valid DL subframe that allows the CSI reference resource to be located on a subframe containing the UL Grant which triggers the aperiodic CSI; if the UE is allocated with 2 or 3 CSI processes, e.g., it is configured under DL TM10 and the number of allocated CSI processes is 2 or 3, $n_{ref}$ is a minimum value satisfying $n_{ref}>=4$ and $n-n_{ref}\epsilon C_H$; if the UE is allocated with 4 CSI processes, e.g., it is configured under DL TM10 and the number of allocated CSI processes is 4, $n_{ref}$ is a minimum value satisfying $n_{ref}>=5$ and $n-n_{ref} \epsilon C_H$.

According to the indication of the bit F in operation 402, the UE shall feed back aperiodic CSI specific to CSI subframe set $C_L$, then the CSI reference resource of the UE is determined in DL subframe $n-n_{ref}$; and the UE further measures the aperiodic CSI. Wherein, if the UE is configured under DL TM1-9 or other DL TM and allocated with only one CSI process, $n_{ref}$ is a valid DL subframe that allows the CSI reference resource to be located on a subframe containing the UL Grant which triggers the aperiodic CSI; if the UE is allocated with 2 or 3 CSI processes, e.g., it is configured under DL TM10 and the number of allocated CSI processes is 2 or 3, $n_{ref}$ is a minimum value satisfying $n_{ref}>=4$ and $n-n_{ref}\epsilon C_L$; if the UE is allocated with 4 CSI processes, e.g., it is configured under DL TM10 and the number of allocated CSI processes is 4, $n_{ref}$ is a minimum value satisfying $n_{ref}>=5$ and $n-n_{ref}\epsilon C_L$.

So far, the present application scenario is ended. According to the present application scenario, the CSI subframe set, to which the aperiodic CSI feedback that is triggered is specific, is indicated by adding one bit to the common physical-layer signaling which indicates the actual TDD UL-DL configuration currently adopted.

Fourth Application Scenario

In the present application scenario, for each CSI feedback subframe n, directly defining that the CSI reference resource is located in a nearest DL subframe $n_{ref}$ which meets requirements for processing time, so as to determine the CSI subframe set to which the triggered aperiodic CSI under the current aperiodic CSI report is specific, depending on the DL subframe $n-n_{ref}$ is pertaining to $C_H$ or $C_L$.

Figure 6:
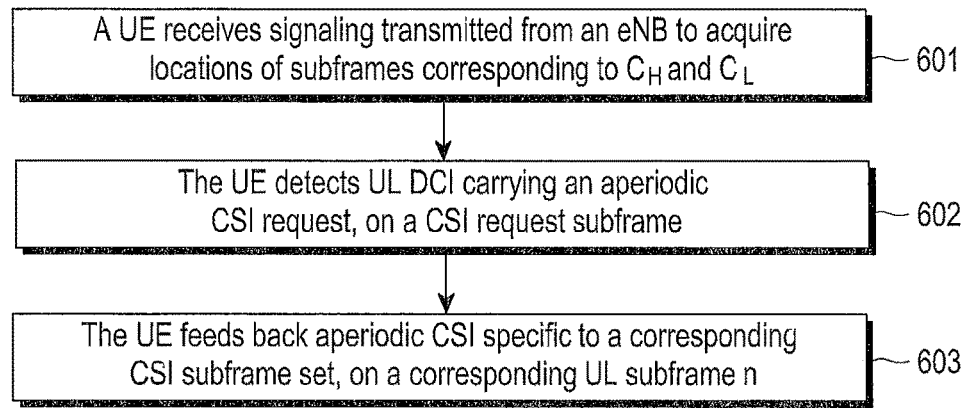
FIG. 6 illustrates a process for implementing a fourth application scenario according to the present disclosure.

As shown in FIG. 6, the method comprising operations as follows:

At operation 601, a UE receives signaling transmitted from an eNB to acquire locations of subframes corresponding to $C_H$ and $C_L$.

Wherein, the signaling usually is a system message or RRC-layer signaling of a cell, and the locations of subframes corresponding to $C_H$ and $C_L$ are indicated by means of Bit Map.

At operation 602, the UE detects UL DCI carrying an aperiodic CSI request, on a CSI request subframe.

At operation 603, the UE feeds back aperiodic CSI specific to a corresponding CSI subframe set, on a corresponding UL subframe n.

In an embodiment, the CSI reference resource of the UE is determined in DL subframe $n-n_{ref}$, and the UE further measures the aperiodic CSI. Wherein, if the UE is configured under DL TM1-9 or other DL TM and allocated with only one CSI process, $n_{ref}$ is a valid DL subframe that allows the CSI reference resource to be located on a subframe containing the UL Grant which triggers the aperiodic CSI; if the UE is allocated with 2 or 3 CSI processes, e.g., it is configured under DL TM10 and the number of allocated CSI processes is 2 or 3, $n_{ref}$ is a minimum value satisfying $n_{ref}>=4$ and $n-n_{ref}\epsilon D_H$ or $D_L$; if the UE is allocated with 4 CSI processes, e.g., it is configured under DL TM10 and the number of allocated CSI processes is 4, $n_{ref}$ is a minimum value satisfying $n_{ref}>=5$ and $n-n_{ref}\epsilon D_H$ or $D_L$.

So far, the present application scenario ends. As above, the aperiodic CSI feedback specific to $C_H$ and $C_L$ can be triggered by directly defining the correlation between the CSI feedback subframe and the subframe where the CSI reference source is located.

Figure 7:
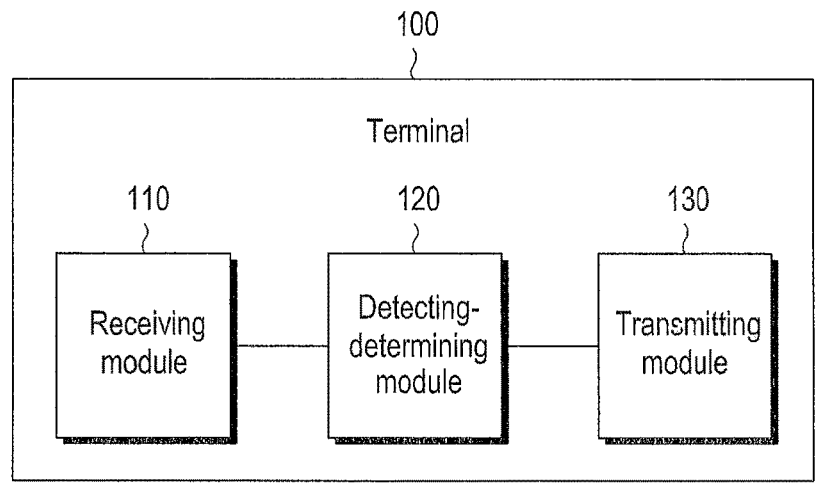
FIG. 7 illustrates a schematic diagram showing the structure of a terminal according to the present disclosure.

Corresponding to the above-mentioned methods, the embodiments of the present disclosure also provide a terminal 100 comprising a receiving module 110, a detecting-determining module 120 and a transmitting module 130, as shown in FIG. 7.

Wherein, the receiving module 110 is configured for receiving information about signaling transmitted from an eNB to acquire locations of subframes corresponding to $C_H$ and $C_L$; wherein $C_H$ and $C_L$ correspond to different subframe sets, respectively;

the detecting-determining module 120 is configured for detecting UL DCI information carrying an aperiodic CSI request, on a CSI request subframe;

the transmitting module 130 is configured for feeding back aperiodic CSI specific to a corresponding CSI subframe set to the eNB, on a corresponding UL subframe.

Wherein, $C_H$ is a flexible subframe set, and $C_L$ is a fixed DL subframe set; or, $C_H$ is a heavily influenced DL or flexible subframe set, and $C_L$ is a weakly influenced or fixed DL subframe set.

In an embodiment, if the detecting-determining module 120 is configured for detecting an aperiodic CSI request on a CSI request subframe pertaining to a set $D_H$, the transmitting module 130 is configured for feeding back aperiodic CSI specific to $C_H$, on a corresponding UL subframe; if the detecting-determining module 120 is configured for detecting an aperiodic CSI request on a CSI request subframe pertaining to a set $D_L$, the transmitting module 130 is configured for feeding back aperiodic CSI specific to $C_L$, on a corresponding UL subframe; wherein $D_H$ and $D_L$ correspond to different DL subframe sets, respectively; or, if the transmitting module 130 is configured for feeding back aperiodic CSI on a CSI feedback subframe pertaining to $U_H$ according to the aperiodic CSI request, the aperiodic CSI is specific to $C_H$; if the transmitting module 130 is configured for feeding back aperiodic CSI on a CSI feedback subframe pertaining to UL according to the aperiodic CSI request, the aperiodic CSI is specific to $C_L$; wherein $U_H$ and $U_L$ correspond to different UL subframe sets, respectively.

In an embodiment, the receiving module 110 is further configured for receiving explicit or implicit signaling transmitted from the eNB, and the detecting-determining module 120 is configured for acquiring the subframe set to which the CSI request subframe or the CSI feedback subframe is pertaining; or, the detecting-determining module 120 is further configured for acquiring the subframe set to which the CSI request subframe or the CSI feedback subframe is pertaining, by means of division standards in accordance with an agreed communication protocol.

In an embodiment, the explicit signaling includes bit-indication information in high-level signaling transmitted from the eNB; or, the implicit signaling includes: an index of PDCCH or EPDCCH of UL DCI format detected by the detecting-determining module 120, in a PDCCH or EPDCCH search space specified by the UE, wherein the PDCCH or EPDCCH of UL DCI format contains the aperiodic CSI request.

Wherein, the PDCCH or EPDCCH search space as specified by the UE is clearly defined in the LIE protocol.

As an embodiment of the terminal 100, the receiving module 110 is further configured for detecting the UL DCI information and acquiring an aperiodic CSI request bit(s) from the UL DCI; the detecting-determining module 120 is further configured for determining a CSI subframe set requiring for feedback according to the aperiodic CSI request bit(s).

In an embodiment, if it is configured under TM1-9, the detecting-determining module 120 is further configured for determining the subframe set(s) $C_H$ and/or $C_L$ to which the aperiodic CSI to be fed back is specific, according to the aperiodic CSI request bit(s).

In an embodiment, if it is allocated with a plurality of CSI processes, e.g., it is configured under DL TM10 and can support a plurality of CSI processes, the detecting-determining module 120 is further configured for determining one or more CSI processes requiring for feedback according to the aperiodic CSI request bit(s).

Wherein, if it is allocated with a plurality of CSI processes, e.g., it is configured under DL TM10 and can support a plurality of CSI processes, the detecting-determining module 120 is further configured for determining the subframe set(s) $C_H$ and/or $C_L$ to which each of the CSI processes requiring for feedback is specific, according to the aperiodic CSI request bit(s).

As an embodiment of the terminal 100, the receiving module 110 is further configured for detecting the physical-layer signaling for indicating the actual TDD UL-DL configuration currently adopted by the flexible TDD reconfiguration cell, to acquire corresponding indication fields from the signaling, and to determine the subframe set(s) $C_H$ and/or $C_L$ to which the aperiodic CSI to be fed back is specific.

As an embodiment of the terminal 100, the detecting-determining module 120 is further configured for determining whether the subframe set, to which a first DL subframe is pertaining, is said $C_H$ or $C_L$, depending on a minimum time interval G, wherein said first DL subframe is a subframe preceding to the CSI feedback subframe and having an interval longer than G with the CSI feedback subframe.

The above terminals according to the disclosure acquire indication information of a CSI subframe set during feeding back the aperiodic CSI, by implicitly or explicitly defining identifiers for CSI subframe sets, so as to trigger aperiodic CSI feedback specific to $C_H$ and $C_L$ in a flexible TDD reconfiguration cell, thus improving the system performance. In addition, the above devices provided by the present disclosure only make minor modification to the existing apparatuses or systems, and hence will not influence the system compatibility. Moreover, the implementations of these devices as provided are both simple and highly effective.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting channel state information (CSI) in a flexible TDD reconfiguration cell, comprising:
    receiving configuration information indicating a plurality of subframe sets including a flexible subframe set and a fixed downlink subframe set;
    receiving aperiodic CSI request information including two bits indicating a subframe set among the flexible subframe set and the fixed downlink subframe set, and indicating a CSI process set for an aperiodic CSI report;
    identifying one of the flexible subframe set and the fixed downlink subframe set as the subframe set for the aperiodic CSI report based on the aperiodic CSI request information; and
    transmitting, to an evolved NodeB (eNB), the aperiodic CSI report corresponding to the identified subframe set.

2. The method of claim 1, wherein the plurality of subframe sets comprise a first subframe set and a second subframe set, and
    wherein the first subframe set is a flexible subframe set and the second subframe is a fixed downlink subframe set.

3. The method of claim 1, wherein the aperiodic CSI request information further indicates whether the aperiodic CSI report is triggered.

4. The method of claim 1, wherein the flexible subframe set is influenced by a neighbor NodeB less than the fixed downlink subframe set is influenced by the neighbor NodeB.

5. A user equipment (UE) transmitting channel state information (CSI) in a communication system, the UE comprising:
    a receiver configured to receive configuration information indicating a plurality of subframe sets including a flexible subframe set and a fixed downlink subframe set, and receive aperiodic CSI request information including two bits indicating a subframe set among the flexible subframe set and the fixed downlink subframe set, and indicating a CSI process set for an aperiodic CSI report;
    a controller configured to identify one of the flexible subframe set and the fixed downlink subframe set as the subframe set for the aperiodic CSI report based on the aperiodic CSI request information; and
    a transmitter configured to transmit, to an evolved NodeB (eNB), the aperiodic CSI report corresponding to the identified subframe set.

6. The UE of claim 5, wherein the plurality of subframe sets comprise a first subframe set and a second subframe set, and
    the first subframe set is a flexible subframe set, and the second subframe set is a fixed downlink subframe set.

7. The UE of claim 5, wherein the aperiodic CSI request information further indicates whether the aperiodic CSI report is triggered.

8. The UE of claim 5, wherein the flexible subframe set is influenced by a neighbor NodeB less than the fixed downlink subframe set is influenced by the neighbor NodeB.

9. A method for receiving channel state information (CSI) of a user equipment (UE) by an evolved NodeB (eNB) in a communication system, the method comprising:
    transmitting configuration information indicating a plurality of subframe sets including a flexible subframe set and a fixed downlink subframe set;
    transmitting aperiodic CSI request information including two bits indicating a subframe set among the flexible subframe set and the fixed downlink subframe set, and indicating a CSI process set for an aperiodic CSI report; and
    receiving the aperiodic CSI report corresponding to one of the flexible subframe set and the fixed downlink subframe set as the subframe set for the aperiodic CSI report identified based on the aperiodic CSI request information from the UE.

10. The method of claim 9, wherein the a plurality of subframe sets comprises a first subframe set and a second subframe set, and
    wherein the first subframe set is a flexible subframe set and the second subframe set is a fixed downlink subframe set.

11. The method of claim 9, wherein the aperiodic CSI request information further indicates whether the aperiodic CSI report is triggered.

12. The method of claim 9, wherein the flexible subframe set is influenced by a neighbor NodeB less than the fixed downlink subframe set is influenced by the neighbor NodeB.

13. An evolved NodeB (eNB) for receiving channel state information (CSI) of a user equipment (UE) in a communication system, the eNB comprising:
    a controller configured to generate configuration information indicating a plurality of subframe sets including a flexible subframe set and a fixed downlink subframe set and aperiodic CSI request information including two bits indicating a subframe set among the flexible subframe set and the fixed downlink subframe set, and indicating a CSI process set for an aperiodic CSI report;
    a transmitter configured to transmit the configuration information and the aperiodic CSI request information; and
    a receiver configured to receive the aperiodic CSI report corresponding to one of the flexible subframe set and the fixed downlink subframe set as the subframe set for the aperiodic CSI report identified based on the aperiodic CSI request information from the UE.

14. The eNB of claim 13, wherein the a plurality of subframe sets comprises a first subframe set and a second subframe set, and
    wherein the first subframe set is a flexible subframe set and the second subframe set is a fixed downlink subframe set.

15. The eNB of claim 13, wherein the aperiodic CSI request information further indicates whether the aperiodic CSI report is triggered.

16. The eNB of claim 13, wherein the flexible subframe set is influenced by a neighbor NodeB less than the fixed downlink subframe set is influenced by the neighbor NodeB.

* * * * *